(12) United States Patent
Rai et al.

(10) Patent No.: US 8,704,414 B2
(45) Date of Patent: Apr. 22, 2014

(54) MACHINES AND METHODS AND ASSEMBLY FOR SAME

(75) Inventors: Mandar Ranganath Rai, Hyderabad (IN); Sreeramachandra Ragidimilli, Hyderabad (IN); Harikiran Murikipudi, Hyderabad (IN); Heramb Joshi, Hyderabad (IN)

(73) Assignee: General Electric Company, Schenectady, NY (US)

( * ) Notice: Subject to any disclaimer, the term of this patent is extended or adjusted under 35 U.S.C. 154(b) by 197 days.

(21) Appl. No.: 13/232,705

(22) Filed: Sep. 14, 2011

(65) Prior Publication Data

US 2013/0062976 A1 Mar. 14, 2013

(51) Int. Cl.
*H02K 5/20* (2006.01)
(52) U.S. Cl.
USPC ........................................ 310/60 A
(58) Field of Classification Search
USPC .................................. 310/60 A, 61
See application file for complete search history.

(56) References Cited

U.S. PATENT DOCUMENTS

| | | | |
|---|---|---|---|
| 3,748,507 A | 7/1973 | Sieber | |
| 4,763,031 A | 8/1988 | Wang | |
| 4,959,570 A | 9/1990 | Nakamura et al. | |
| 5,130,585 A | 7/1992 | Iwamatsu et al. | |
| 5,332,369 A | 7/1994 | Jensen | |
| 5,859,482 A | 1/1999 | Crowell et al. | |
| 6,087,744 A * | 7/2000 | Glauning | 310/58 |
| 6,191,511 B1 * | 2/2001 | Zysset | 310/60 A |
| 6,317,963 B1 * | 11/2001 | Powers et al. | 29/596 |
| 6,727,609 B2 | 4/2004 | Johnsen | |
| 6,897,581 B2 * | 5/2005 | Doherty et al. | 310/52 |
| 6,909,210 B1 | 6/2005 | Bostwick | |
| 7,008,348 B2 | 3/2006 | LaBath | |
| 7,009,317 B2 | 3/2006 | Cronin et al. | |
| 7,994,668 B2 * | 8/2011 | Gerstler et al. | 310/61 |
| 2007/0108852 A1 | 5/2007 | Bolsoy | |
| 2007/0228847 A1* | 10/2007 | Kim | 310/61 |
| 2008/0024020 A1* | 1/2008 | Iund et al. | 310/61 |

* cited by examiner

*Primary Examiner* — Nguyen N Hanh
(74) *Attorney, Agent, or Firm* — Armstrong Teasdale LLP

(57) ABSTRACT

An operating device for a machine includes a shaft having a channel extending through the shaft and includes a fluid mover coupled to the shaft. The fluid mover is in flow communication with the channel to channel a fluid through the channel to facilitate treating the shaft with the fluid.

18 Claims, 7 Drawing Sheets

MACHINES AND METHODS AND ASSEMBLY FOR SAME

BACKGROUND

The present disclosure relates generally to machines and more particularly to methods and devices for use in fluid treatment of the machines.

Machines such as motors generate heat during operation as a result of both electrical and mechanical losses. Typically, an electric motor must be cooled to facilitate the desired and efficient operation of the motor. An excessively high motor temperature may result in motor bearing failure or damage to the stator or to the rotor.

Designing a motor involves many considerations. For example, rotor temperature is a limiting factor in motor design as the rotor can generate a proportionally high amount heat for the motor. At least some known electric motors include an enclosure including a frame and endshields. The most common enclosures are "open" or totally enclosed. In an "open" enclosure, ambient air circulates within the enclosure, and heat is removed by convection between the air and heat generating motor components within the enclosure. The heated air is exhausted from the enclosure. Because such enclosures are open, the locations in which such motors may be used are generally limited.

In contrast, totally enclosed type enclosures typically are often used in applications in which airborne contaminants, e.g., dirt, oil, or mist, must be prevented from entering within the enclosure. Both convection and conduction type cooling occurs within the enclosure, and some form of convection cooling occurs along the external surfaces of the enclosure. For example, forced convection cooling can be provided by a fan directly mounted to the motor shaft external the enclosure. Efficiently cooling the drive end side of the motor and components such as the rotor, however, enhances operation of the motor. However, an externally, shaft mounted fan provides limited heat dissipation with respect to the drive end side of the motor. Consequently, components within the enclosure, such as the drive end bearings may still overheat due to inefficient cooling. Additionally, shaft mounted fans also provide limited heat dissipation with respect to the rotor.

BRIEF DESCRIPTION

In one aspect, an operating device is provided. The operating device includes a shaft having channel extending through the shaft and includes a fluid mover coupled to the shaft in flow communication with the channel to channel a fluid through the channel to facilitate treating the shaft with the fluid.

In another aspect, a machine is provided. The machine includes a stator, a rotor and a hollow shaft mounted within the rotor for rotation in the stator, wherein the hollow shaft includes a channel. The electric motor further includes a fluid mover coupled to the hollow shaft and configured to be in flow communication with the channel to channel a fluid through the channel to facilitate treating the shaft with the fluid.

In a further aspect, a method of manufacturing an operating device for a machine is provided. The method includes forming a channel in a drive shaft and coupling a fluid mover to the shaft such that the fluid mover is in flow communication with the channel. The method further includes coupling the hollow shaft to a rotor of the machine.

DETAILED DESCRIPTION

Figure 1:
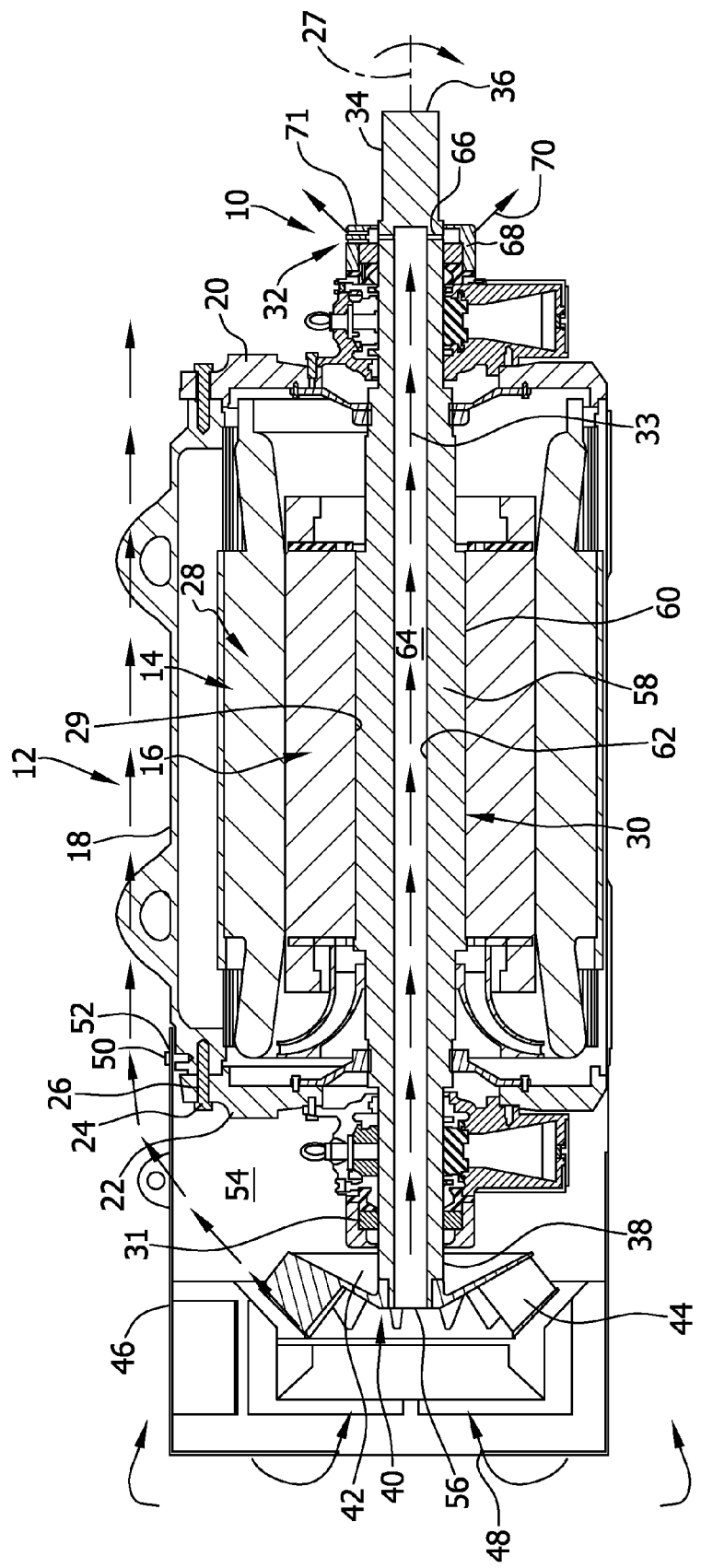
FIG. 1 illustrates a side, elevational view of an exemplary operating device that may be used with a motor.

FIG. 1 is a side, elevational view of an exemplary operating device 10 and a machine such as motor 12. In the exemplary embodiment, operating device 10 facilitates treating motor 12 with a fluid (not shown in FIG. 1) for thermal consideration such as, but not limited to, facilitating heat dissipation from motor 12 and/or maintaining temperatures of motor 12. Moreover, in the exemplary embodiment, motor 12 is an electric motor. Motor 12 includes a stationary assembly or stator (generally designated 14) and a rotatable assembly or rotor (generally designated 16) magnetically coupled to stator 14. An enclosure 18 of motor 12 houses stator 14 and rotor 16. A front endshield 20 and an opposite back endshield 22 define opposite longitudinal ends of enclosure 18. Endshields 20 and 24 are connected by several circumferentially spaced fasteners 24 that extend through corresponding bores 26 on each endshield 20 and 24.

Stator 14 holds one or more wire-wound coils, or windings (generally designated 28). In particular, stator 14 may be formed of a series of thin laminates placed side-by-side formed of conducting material. Rotor 16 is housed within stator 14 and is configured to rotate within stator 14 to create torque.

Electric motor 12 transforms electrical energy into mechanical torque, or vice versa, when stator windings 28 are energized with electrical current and interact with rotor 16 as rotor 16 rotates. During motor operation, stator 14 and rotor 16 generate heat as a result of electrical and mechanical losses. Many aspects of stator 14 and rotor 16 described above are conventional and will not be described in further detail.

In the exemplary embodiment, operating device 10 includes a hollow shaft 30 and at least one fluid mover, generally shown as 32, that is coupled to shaft 30. Shaft 30 and fluid mover 32 facilitate moving fluid 33, such as but not limited to, air, within and from shaft 30 to facilitate treating motor 12 with fluid 33. In the exemplary embodiment, the hollow shaft 30 and fluid mover 32 facilitate cooling of motor 12.

Shaft 30 extends through an open center 29 of rotor 16 along an axis of rotation 27 for motor 12. Formed in a cylindrical shape, open center 29 of rotor 16 facilitates coupling to motor shaft 30. Shaft 30 may be fixed to rotor 16 such that shaft 30 will be driven by rotor 16, as rotor 16 rotates. Likewise, when shaft 30 rotates, shaft 30 may drive rotor 16. Bearings 31 rotatably support shaft 30 within enclosure 18.

Shaft 30 has a first end 34 that extends through and outward from front endshield 20 to enable work output by shaft 30. First end 34 includes an end wall 36 that is a distance from fluid mover 32. End wall 36 substantially seals shaft 30 near first end 34. Shaft 30 also includes a second end 38 that extends through and a distance from back endshield 22 to enable coupling with a fan 40. In the exemplary embodiment, fan 40 includes a body 42 and blades 44 that extend outward from body 42 to facilitate moving air towards electric motor 12.

A fan cover 46 is removably coupled to electric motor 12 adjacent to endshield 22. Vents 48 extend through at least one side of fan cover 46. Fan cover 46 is connected by several circumferentially-spaced fasteners 50 that extend through bores 52 defined on electric motor 12. When coupled to motor 12, fan cover 46 at least partially defines an interior cavity 54 that is sized to house fan 40 and second end 38 therein. Second end 38 has an open end 56 that is in flow communication with interior cavity 54.

Shaft 30 also includes a body 58 having an outer surface 60 and an inner surface 62. Body 58 extends between drive ends 34 and 38, and is aligned such that inner surface 62 forms an axial passageway or channel 64 that extends between ends 34 and 38. In an embodiment, channel 64 extends substantially co-axially through shaft 30. Shaft 30 also includes at least one bore 66 that extends through outer surface 60 and inner surface 62. Bore 66 is in flow communication with channel 64. In an embodiment, bore 66 extends substantially radially from channel 64.

Fluid mover 32 of device 10 is coupled to shaft outer surface 60 adjacent to end wall 36. In the exemplary embodiment, fluid mover 32 includes a housing 68 having outlets 70 defined in flow communication with the ambient environment. Outlets 70 are in flow communication with end bore 66, such that fluid mover 32 is in flow communication with channel bore 66 and channel 64. In the exemplary embodiment, fluid mover 32 also includes a vacuum device 71 that induces negative pressure to fluid 33 in channel 64. Any other device configured to draw or force fluid within channel 64 is intended to be within the disclosure herein.

During operation of motor 12, stator 14 is energized to rotate rotor 16 and shaft 30. Fan 40 rotates in response to the rotation of shaft 30 to cause ambient air 33 to be drawn through enclosure vents 48 towards and across motor 12 to facilitate cooling of motor 12. Fan 40 also forces air 33 into second end 38 such that air 33 is channeled into shaft channel 64 and towards first end 34. Air 33 flowing through shaft 30 and into channel 64 facilitates heat transfer via convection from motor components. Fan 40 also causes spent or heated air 33 to move through channel 64 towards first end 34.

During motor operation, fluid mover 32 also rotates with shaft 30. In response to shaft rotation, fluid mover 32 induces a negative pressure within channel 64 to facilitate drawing spent/heated air 33 within channel 64 to move through bore 66 and through outlets 70. The forced air movement in channel 64 facilitates dissipating heat from motor 12.

Figure 2:
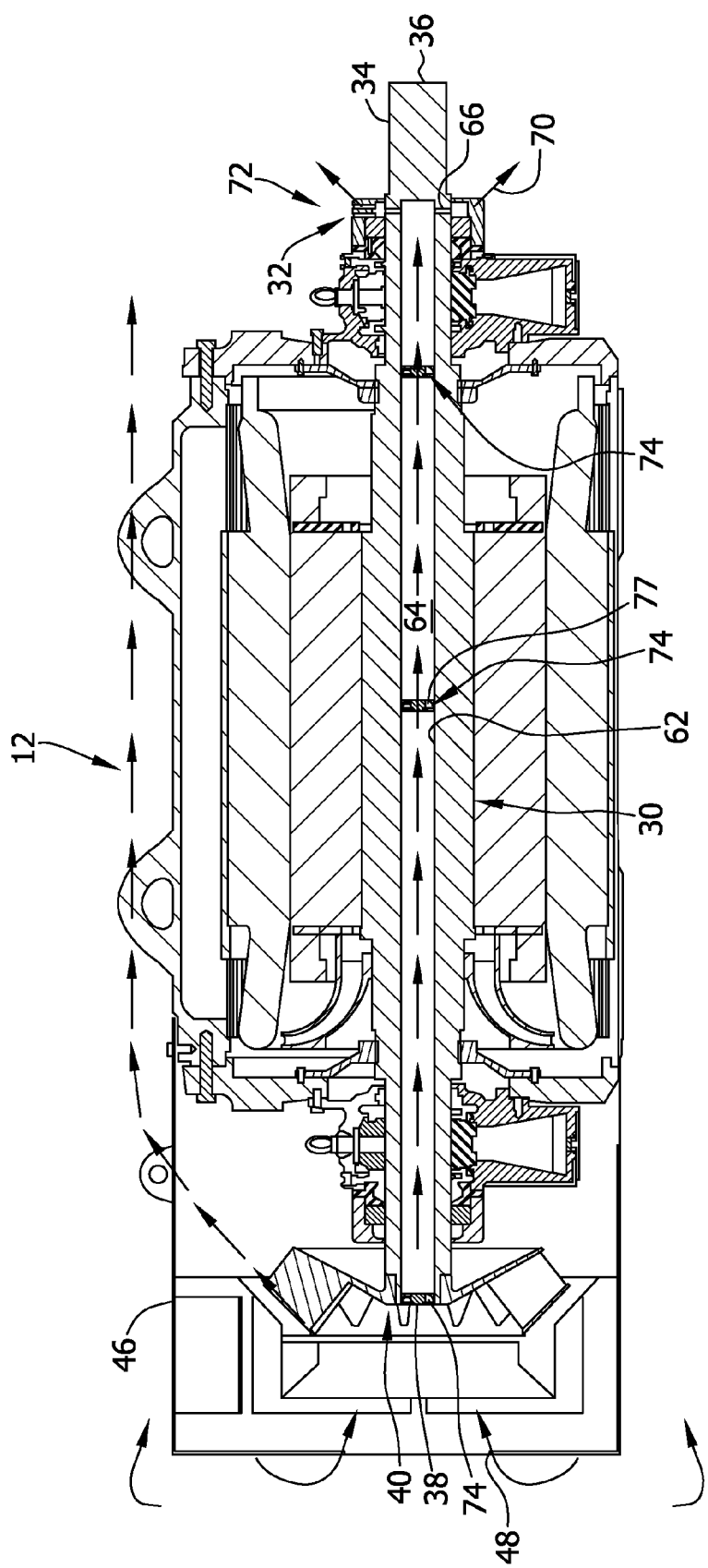
FIG. 2 illustrates a side, elevational view of an alternative operating device that may be used with the motor of FIG. 1.
Figure 3:
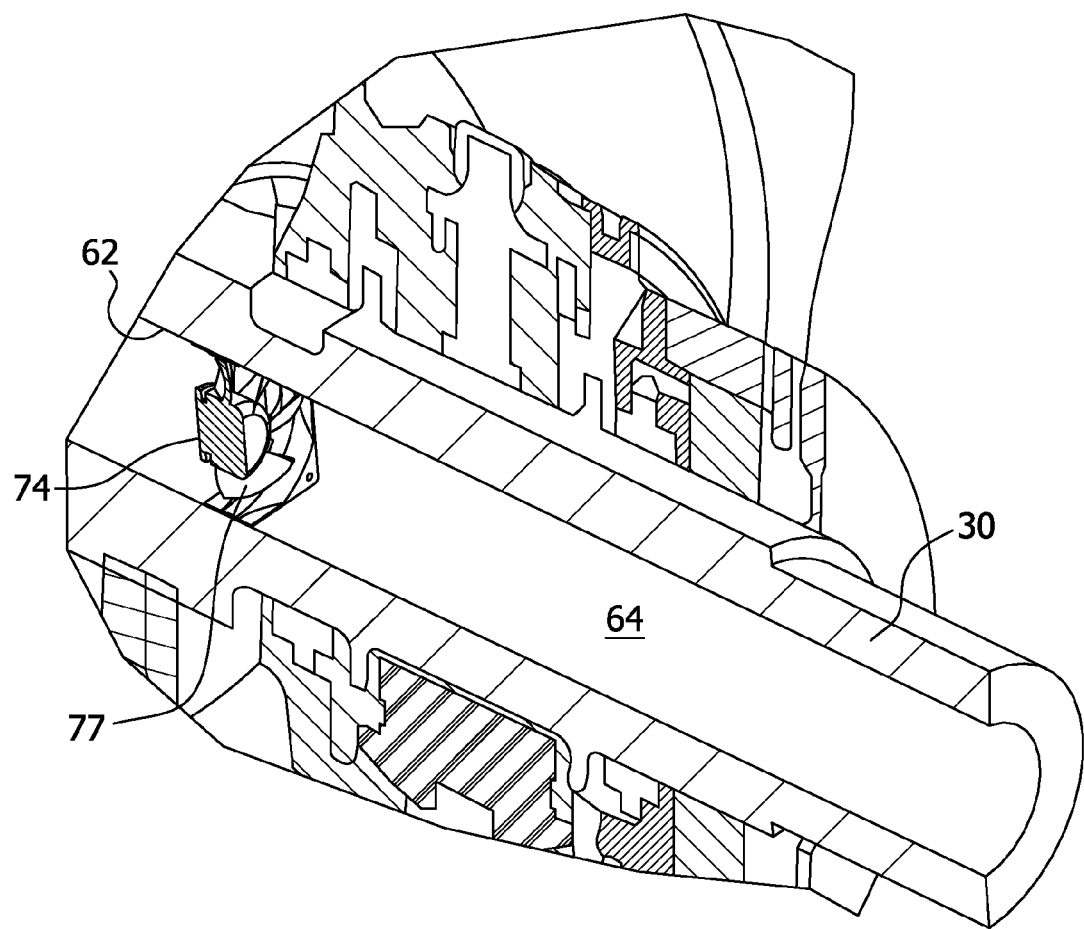
FIG. 3 illustrates a partial cross sectional view of an internal fluid mover used with the operating device shown in FIG. 2.

FIG. 2 is a side elevational view of an alternative embodiment of operating device 72. FIG. 3 is a partial cross sectional view of an internal fluid mover 74 used with operating device 72. In the exemplary embodiment, operating device 72 includes shaft 30 and fluid mover 32. Moreover, in FIG. 2 and FIG. 3, the same reference numerals are illustrated to indicate the same components previously defined in FIG. 1. In the exemplary embodiment, operating device 72 also includes at least one internal fluid mover 74 located within channel 64. Fluid mover 74 facilitates moving fluid from first end 34, through channel 64 and towards fluid mover 32. Alternatively, any other fluid moving device may be used that enables operating device 72 to function as described herein.

In the exemplary embodiment, fluid mover 74 includes an electric fan 77 that is mounted within channel 64. In one embodiment, fan 77 is a DC fan with a commutated external rotor that includes integrated commutation electronics. In the exemplary embodiment, electric fans 77 are mounted at a plurality of locations within channel 64 such as near second end 38, near a midpoint of channel 64, and near first end 34. At least one fan 77 can be located anywhere within channel 64 to facilitate moving fluid 33 within channel 64.

During operation of motor 12, fan 40 rotates in response to the rotation of shaft 30 and draws ambient air 33 through vents 48 of cover 46 and towards and across motor 12 to facilitate treating, such as, but not limited to, cooling of motor 12. Fan 40 also forces air 33 into shaft channel 64 and towards first end 34. Fan 77 moves air 33 within channel 64 towards end bore 66 such that air 33 facilitates heat transfer via convection from motor components.

Furthermore, fluid mover 32 also rotates with shaft 30 during motor operation. In response to shaft rotation, fluid mover 32 induces a negative pressure within channel 64 to facilitate drawing heated/spent air 33 within channel 64 through outlets 70. Air 33 flowing through channel 64 facilitates treating motor 12. In the exemplary embodiment, air 33 flowing through channel 64 acts as a coolant fluid to facilitate dissipating heat from motor 12.

Figure 4:
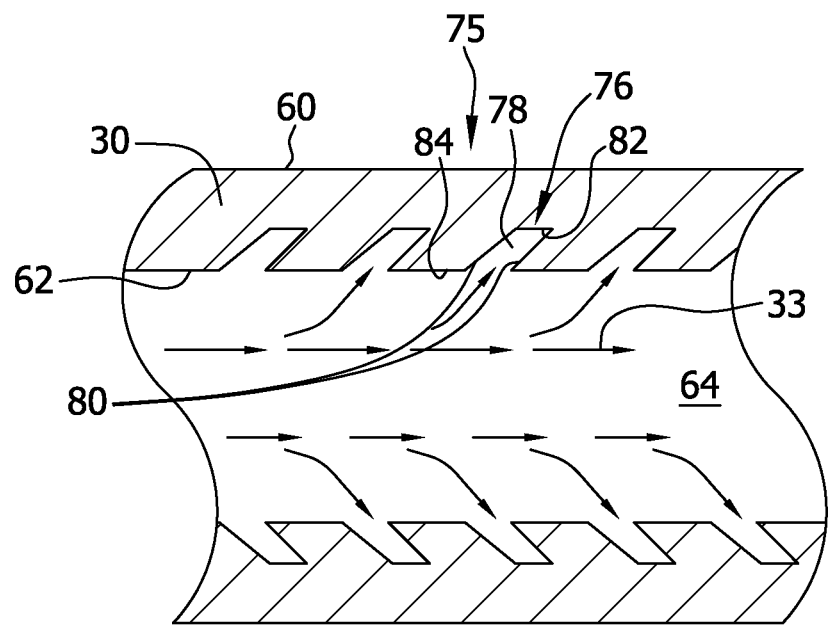
FIG. 4 illustrates a partial side, elevational view of an exemplary heat transfer member that may be used with the operating device shown in FIG. 1 and FIG. 2.

FIG. 4 is a partial side elevational view of an alternative operating device 75 that may be used with motor 12 (shown in FIG. 1). In the exemplary embodiment, operating device 75 includes shaft 30 and fluid mover 32. Moreover, in FIG. 4, the same reference numerals are illustrated to indicate the same previously identified components in FIG. 1. Operating device 75 also includes at least one heat transfer member 76 located within channel 64. In the exemplary embodiment, heat transfer member 76 includes at least one groove 78 formed within inner surface 62.

Each groove 78 is defined by opposing side walls 80 and an end wall 82 that extends between side walls 80. In the exemplary embodiment, each groove 78 has a substantially uniform size and configuration, and each is oriented obliquely within inner surface 62 and towards channel 64. Moreover, grooves 78 are substantially uniformly spread along inner surface 62 from first end 34 to second end 38 (shown in FIG. 1) such that successive grooves 78 form a heat fin 84 therebetween. In alternative embodiments (not shown), grooves 78 can have different sizes, configurations, orientations, and spacing distributions along inner surface 62. The sizes, configurations, orientations, and spacing distributions of grooves 78 can be variably selected based on heat transfer modeling of motor 12. Alternatively, any other heat transfer member may be used that enables operating device 75 to function as described herein.

During operation of motor 12, fan 40 rotates in response to the rotation of shaft 30 to cause ambient air 33 to be drawn through enclosure vents 48 towards and across motor 12 to facilitate treatment such as, but not limited to, cooling of motor 12. Fan 40 also forces air 33 into second end 38 such that air 33 is channeled into shaft channel 64, across grooves 78 and heat fins 84 and towards first end 34. The grooves 78 and heat fins 84 enable heat transfer out of motor 12. Air 33 facilitates heat transfer via convection from motor components, through shaft 30 and into channel 64.

During motor operation, fluid mover 32 also rotates with shaft 30. In response to shaft rotation, fluid mover 32 induces a negative pressure within channel 64 to facilitate drawing spent/heated air 33 within shaft channel 64, across grooves 78 and heat fins 84, through at least one bore 66 and beyond outlets 70.

Figure 5:
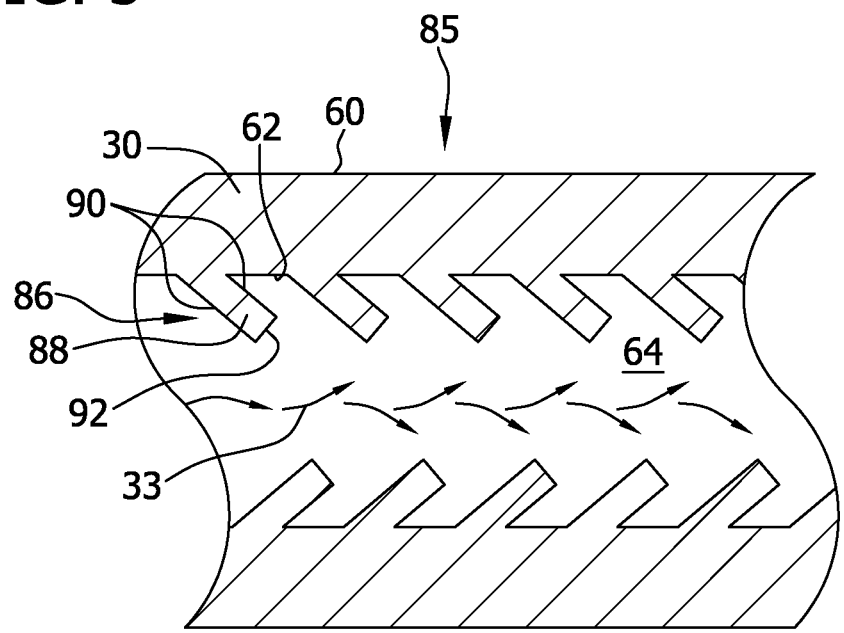
FIG. 5 illustrates a partial side, elevational view of an alternative heat transfer member that may be used with the operating device shown in FIG. 1 and FIG. 2.

FIG. 5 is a partial side elevational view of an alternative embodiment of operating device 85. Operating device 85 includes shaft 30 and fluid mover 32. Moreover, in FIG. 5, the same reference numerals are illustrated to indicate the same previously identified components in FIG. 1. Operating device 85 also includes at least one heat transfer member 86 located within channel 64. In the exemplary embodiment, heat transfer member 86 includes at least one fin 88 extending from inner surface 62 and into channel 64. Each fin 88 is defined by opposing side walls 90 and an end wall 92 that extends between side walls 90. In the exemplary embodiment, each fin 88 has a substantially uniform size and configuration, and each fin 88 is oriented obliquely within channel 64. Moreover, fins 88 are substantially uniformly spread along inner surface 62 from first end 34 to second end 38. In alternative embodiments (not shown), fins 88 can have different sizes, configurations, orientations and distributions along inner surface 62. The sizes, configurations, orientations, and spacing distributions of fins 88 can be variably selected based on heat transfer modeling of motor 12. Any heat transfer fin may be used that enables heat dissipation from motor 12 as described herein.

During operation of motor 12, fan 40 rotates in response to the rotation of shaft 30 and draws ambient air 33 through enclosure vents 48 and towards and across motor 12 to facilitate treatment such as, but not limited to, cooling of motor 12. Fan 40 also forces air 33 into shaft channel 64, across the heat fins 88 and toward first end 34. Heat fins 88 are configured to facilitate heat transfer out of motor 12. Air 33 facilitates heat transfer via convection from motor components, through shaft 30 and into channel 64.

During motor operation, fluid mover 32 also rotates with shaft 30. In response to shaft rotation, fluid mover 32 induces a negative pressure within channel 64 to facilitate drawing spent/heated air 33 within channel 64 to move across heat fins 88, through at least one bore 66 and through outlets 70. The forced movement in channel 64 facilitates treating motor 12, such as dissipating heat from motor 12.

Figure 6:
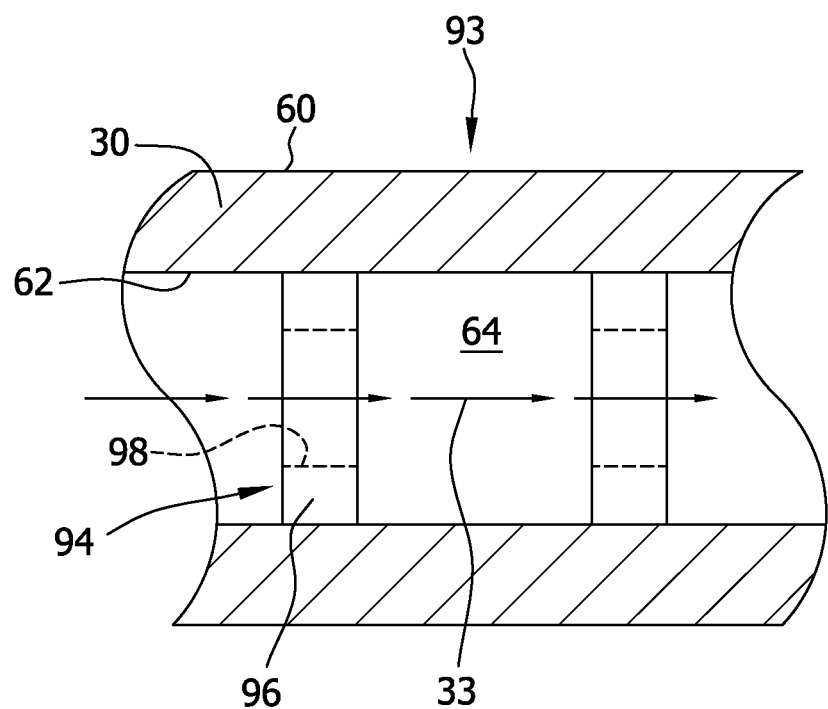
FIG. 6 illustrates a partial side, elevational view of an exemplary support member that may be used with the operating device located shown in FIG. 1 and FIG. 2.

FIG. 6 is a partial side elevational view of an alternative embodiment of operating device 93. Operating device 93 includes shaft 30 and fluid mover 32. Moreover, in FIG. 6, the same reference numerals are illustrated to indicate the same previously identified components in FIG. 1. Operating device 93 also includes at least one support 94 located within channel 64. Since shaft 30 is hollow, support 94 enables stiffening of shaft 30 to facilitate countering bending forces applied to shaft 30 during motor operation. Support 94 includes a body 96 coupled to inner surface 62 of shaft 30. In the exemplary embodiment, body 96 includes a bore 98 formed therethrough in order to enable fluid movement through support 94.

Each support 94 has a substantially uniform size and configuration. Further, supports 94 are substantially uniformly spread along inner surface 62 from first end 34 to second end 38. In alternative embodiments (not shown), supports 94 can have different sizes, configurations, orientations, and spacing distributions along inner surface 62. The sizes, configurations, orientations, and spacing distributions of supports 94 can be variably selected based on force or load modeling of motor 12. Any supporting device may be used to increase stiffness of shaft 30 as described herein.

In alternative embodiments (not shown), external fluid mover 32 can be removed to expose at least one bore 66 of shaft 30 to the ambient environment. In this embodiment, at least one bore 66 enables exposure of fluid 33 to the ambient environment for heat dissipation of motor 12. The rotation of hollow shaft 30 with external fan 40 and at least one bore 66 facilitate moving heated fluid 33 through channel 64 via bore 66. Additionally, in alternative embodiments (not shown), internal fluid movers 74 and/or heat grooves 78 and/or heat fins 84 or 88 and/or supports 94 can be mounted in channel 64 with one another in a variety of combinations based on heat transfer and load modeling of motor 12.

Figure 7:
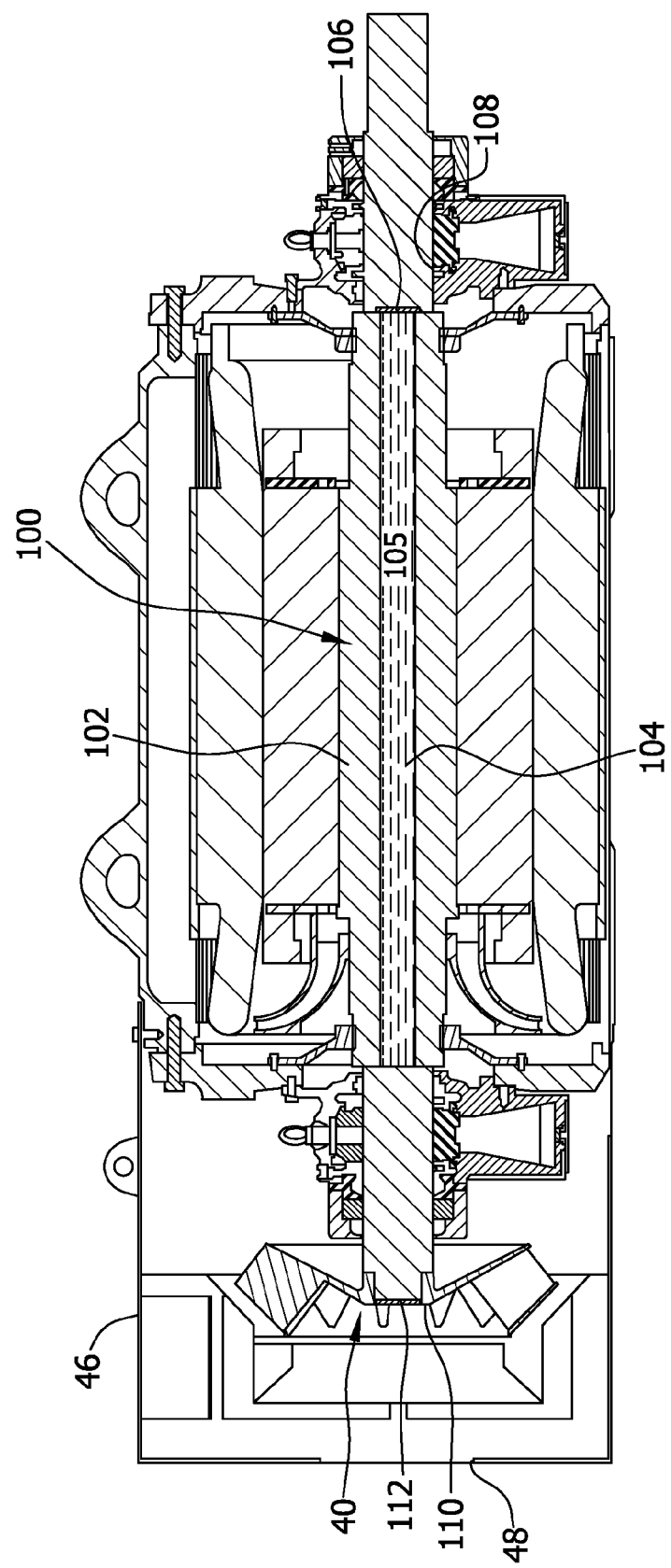
FIG. 7 illustrates a side, elevational view of an alternative operating device that may be used with the operating device shown in FIG. 1 and FIG. 2.

FIG. 7 is a partial side elevational view of an alternative embodiment of operating device 100. Operating device 100 includes shaft 102 and a cooling fluid 104 formed within a channel 105 of hollow shaft 102. In the exemplary embodiment, end wall 106 substantially seals shaft 102 near drive end 108. Opposite drive end 110 includes another end wall 112. End walls 110 and 112 enable sealing cooling fluid 104 within channel 105 of shaft 102. Fluid 104 may include a liquid such as, but not limited to, oil or grease. Any fluid may be used that enables treatment of motor 12, such as heat dissipation from motor 12, as described herein. In the exemplary embodiment, fluid 104 is deposited into channel 105 through an inlet port (not shown) which is closed after fluid deposition. End walls 110 and 112 are configured to seal fluid 104 to facilitate forming a substantially closed system such that fluid 104 remains in channel 105.

During operation of motor 12, external fan 40 rotates in response to rotation of shaft 102 to cause air to be drawn through vents 48 towards and across motor 12 to facilitate treatment of motor 12, such as cooling of motor 12. Fluid 104 facilitates heat transfer via conduction from motor components, through shaft 102 and into channel 105.

Figure 8:
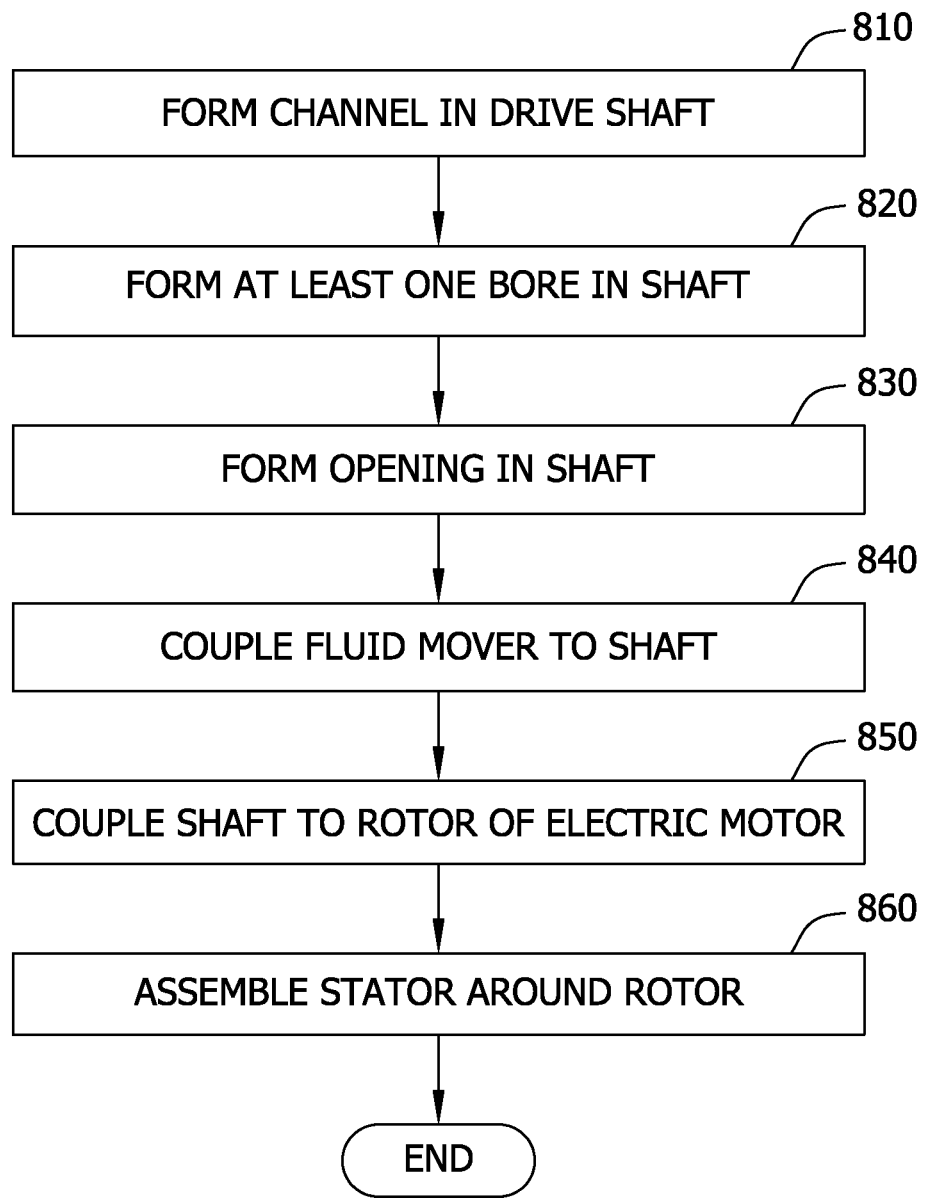
FIG. 8 illustrates a flowchart of an exemplary method that may be used to assembly the operating device shown in FIG. 1 and FIG. 2.

FIG. 8 is a flowchart of an exemplary method that may be used to assemble an operating device, such as operating device 10 (shown in FIG. 1). In the exemplary embodiment, any or all of the manufacturing processes can be performed on a new motor to be assembled or may be used in retrofitting an existing motor.

A hollow shaft, such as shaft 30 (shown in FIG. 1) is provided 810 wherein the shaft includes an inner surface that defines the channel extending substantially co-axially through the shaft. At least one bore that is provided 820 near a drive end of the shaft, and at least one opening is defined 830 near the opposite drive end of the shaft. At least one fluid mover, such as fluid mover 32 (shown in FIG. 1) is coupled 840 to the shaft. In one embodiment, the fluid mover is externally coupled to the shaft near the drive end of the shaft such that the mover is in flow communication with the at least one bore 66. In another method of manufacturing, the internal fluid mover 32 is coupled to the shaft 30 within the channel 64. Additionally, in another method of manufacturing, a heat transfer member 74 is mounted within the channel 64. Still further, in another method of manufacturing, a support 94 is mounted within the channel 64. The hollow shaft 30 is then coupled 850 to the rotor 16. The stator 14 is assembled 860 around the rotor 16.

The present disclosure describes a hollow shaft and a fluid mover which enhances motor operation by using the motor shaft for thermal consideration such as heat dissipation and/or temperature maintenance. The hollow shaft allows the designer to model characteristics, such as heat transfer and load transfer, for the motor. By using a hollow shaft and fluid mover, the motor can be designed to operate the motor at high efficiency performance and with efficient heat dissipation. With better cooling and heat dissipation, more power can be supplied to the motor. Thus, horsepower can be increased with less electrical and mechanical frictional losses. The hollow shaft can be used for new manufacture of motors or for integration with existing motors.

The exemplary embodiment of increasing heat dissipation from the motor is provided by mounting the hollow shaft within the rotor and coupling the fluid mover to the shaft. Hollow shafts provide advantages such as, but not limited to: manufacturing ease; less weight; higher temperature gradient leading to better cooling; elimination of rotor vents; increased power input to the motor; increased motor efficiency; increased bearing life due to less shaft weight and decrease in bearing temperature; lower temperatures on the drive side that facilitates better heat distribution and increased shaft stiffness resulting in transmitting higher torque.

A technical effect of the device described herein includes the shaft and operating device which facilitates treating a machine, such as heat dissipation from the machine and/or temperature maintenance of the machine. Another technical effect of the profile includes using a hollow shaft and fluid mover, so that the motor can be designed to operate the machine at high efficiency performance and with efficient heat dissipation.

Exemplary embodiments of a shaft, a fluid mover, and methods of manufacturing and assembling the motor are described above in detail. The shaft, fluid mover, and methods are not limited to the specific embodiments described herein, but rather, components of the shaft and/or the fluid mover and/or steps of the method may be utilized independently and separately from other components and/or steps described herein. For example, the shaft, fluid mover and methods may also be used in combination with other machines and methods, and are not limited to practice with only the motor as described herein. Rather, the exemplary embodiments can be implemented and utilized in connection with many other turbine and/or power and/or generator applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is formed by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An operating device for a machine, said operating device comprising:
    a rotatable shaft comprising a first end, a second end, and a body extending between said first and second ends, said body comprising a channel extending substantially axially therethrough that defines an inner surface of said rotatable shaft;
    a fluid mover in flow communication with said channel and coupled to an inner surface of said rotatable shaft, wherein said fluid mover is configured to channel a fluid through said channel to facilitate treating said rotatable shaft with the fluid; and
    a support coupled to the inner surface of said rotatable shaft, wherein said support is configured to support said rotatable shaft.

2. The operating device of claim 1, wherein said second end is coupled in flow communication with said channel.

3. The operating device of claim 1, further comprising at least one bore extending substantially radially through said rotatable shaft, said at least one bore is in flow communication with said channel.

4. The operating device of claim 3, wherein said fluid mover is in flow communication with said at least one bore.

5. The operating device of claim 1, wherein said fluid mover comprises a fan.

6. The operating device of claim 1, further comprising a heat transfer member coupled within said channel.

7. The operating device of claim 6, wherein said heat transfer member comprises a groove formed within said channel.

8. The operating device of claim 6, wherein said heat transfer member comprises a fin extending from an inner surface of said rotatable shaft and into said channel.

9. A machine, comprising:
    a stator having a longitudinal axis;
    a rotor mounted within said stator;
    a rotatable shaft comprising a first end, a second end, and a body extending between said first and second ends, said body comprising a channel extending substantially axially therethrough that defines an inner surface of said rotatable shaft;
    a fluid mover in flow communication with said channel and coupled to an inner surface of said rotatable shaft, wherein said fluid mover is configured to channel a fluid through said channel to facilitate treating said rotatable shaft with the fluid; and
    a support coupled to the inner surface of said rotatable shaft, wherein said support is configured to support said rotatable shaft.

10. The machine of claim 9, further comprising at least one bore extending substantially radially through said rotatable shaft near said drive end, said at least one bore is in flow communication with said channel.

11. The machine of claim 10, wherein said fluid mover is coupled in flow communication with said at least one bore.

12. The machine of claim 9, wherein said fluid mover is coupled within said channel.

13. The machine of claim 12, wherein said fluid mover comprises a fan.

14. The machine of claim 9, further comprising a heat transfer member coupled within said channel.

15. A method of manufacturing an operating device for a machine, said method comprising:
    forming a channel in a rotatable shaft such that the channel extends substantially co-axially through the rotatable shaft and defines an inner surface of said rotatable shaft;
    coupling a fluid mover to the inner surface of said rotatable shaft such that the fluid mover is in flow communication with the channel and is orientated to discharge fluid into the channel;
    coupling the rotatable shaft to a rotor of the machine; and
    coupling a support to the inner surface of the rotatable shaft, wherein the support is configured to support the rotatable shaft.

16. The method of claim 15, wherein coupling the fluid mover to the rotatable shaft comprises coupling the fluid mover to at least one bore defined in the rotatable shaft.

17. The method of claim 15, wherein coupling the fluid mover to the rotatable shaft further comprises coupling the fluid mover within the channel.

18. The method of claim 15, further comprising coupling a heat transfer member within the channel, wherein the heat transfer member is positioned to transfer heat from the machine.

* * * * *